US009489179B2

(12) United States Patent
Pesarese

(10) Patent No.: US 9,489,179 B2
(45) Date of Patent: Nov. 8, 2016

(54) APPLICATION PROGRAMMING INTERFACE TRACING MECHANISM

(75) Inventor: Marco Pesarese, Nussloch (DE)

(73) Assignee: Business Objects Software Ltd., Dublin (IE)

( * ) Notice: Subject to any disclaimer, the term of this patent is extended or adjusted under 35 U.S.C. 154(b) by 322 days.

(21) Appl. No.: 13/415,649

(22) Filed: Mar. 8, 2012

(65) Prior Publication Data

US 2013/0239096 A1    Sep. 12, 2013

(51) Int. Cl.
*G06F 9/44* (2006.01)
*G06F 11/34* (2006.01)

(52) U.S. Cl.
CPC .......... *G06F 8/316* (2013.01); *G06F 11/3466* (2013.01); *G06F 2201/86* (2013.01); *G06F 2201/865* (2013.01)

(58) Field of Classification Search
CPC ...... G06F 9/44; G06F 11/3466; G06F 8/316; G06F 2201/865; G06F 2201/86
USPC ................................................. 717/127, 128
See application file for complete search history.

(56) References Cited

U.S. PATENT DOCUMENTS

| 6,721,941 B1* | 4/2004 | Morshed et al. ............. 717/127 |
| 2008/0127109 A1* | 5/2008 | Simeon ........................ 717/128 |
| 2011/0264787 A1* | 10/2011 | Mickens et al. ............. 709/224 |

OTHER PUBLICATIONS

"Tracing (software)", [on-line]. 2011, Wikipedia(r). [retrieved on Feb. 1, 2012]. Retrieved from the Internet: <URL: http://en.wikipedia.org/w/index.php?title=Tracing_(software)&printable=yes>, (2011) , 4 pgs.*

"Development Aspects", [online]. 2012 The Eclipse Foundation. [retrieved on Feb. 1, 2012]. Retrieved from the Internet: <http://www.eclipse.org/aspectj/doc/released/progguide/starting-development.html>, (Feb. 1, 2012), 3 pgs.

"Tracing (software)", [on-line]. 2011, Wikipedia(r). [retrieved on Feb. 1, 2012]. Retrieved from the Internet: <URL: http://en.wikipedia.org/w/index.php?title=Tracing_(software)&printable=yes>, (2011), 4 pgs.

* cited by examiner

*Primary Examiner* — Wei Zhen
*Assistant Examiner* — Mohammed Huda
(74) *Attorney, Agent, or Firm* — Schwegman Lundberg & Woessner, P.A.

(57) ABSTRACT

Example systems and methods of providing an application programming interface tracing mechanism are presented. In one example, an application programming interface for an application is provided, the interface including an interface object. A proxy object is created for the interlace object. At the proxy object, method calls from the application for the interface object are received, recorded, and passed to the interface object. An execution trace including the recorded method calls is generated.

18 Claims, 7 Drawing Sheets

APPLICATION PROGRAMMING INTERFACE TRACING MECHANISM

BACKGROUND

Software developers typically invest many hours testing each section or module of software they develop to help ensure that the software will operate as expected without generating errors, faults, or other execution maladies. Such testing may include tests executed at the object, module, and application level within a development environment, such as that provided by way of an integrated development environment facilitating the writing, testing, debugging, and revision of software.

However, despite attempts to deliver error-free software to the user, untested or unanticipated uses of the software may cause problems to occur. To detect sources of errors in such cases, some software provides a tracing mode, in which the execution path of the software is recorded for subsequent perusal by software developers or maintenance personnel. By reviewing the resulting trace, which is often provided in a log file or similar data structure, the developer may determine the cause of the error and revise the software to eliminate it. In some cases, parameters and return values associated with methods or functions may be added to the log file to provide useful information to the developer.

To provide the tracing information, developers typically add instructions to each method or function of interest to store the data to the tracing log file. In addition, these additional instructions may be executed only under the condition that tracing functionality is enabled. In many implementations, a user of the software may enable the tracing functionality by way of an additional input when the user initiates execution of the software.

One alternative to the typical tracing implementation described above is the use of aspect-oriented programming, by which a special compiler may "inject" additional code into the software to provide instructions for the tracing function. Some implementations of such an alternative, however, may be difficult to implement in large professional production software suites that are compiled using standard compilers. Also, allowing a user to enable or disable tracing functionality at runtime and applying such tracing to only specific user sessions may not be possible with some compilers.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for tracing an object-oriented application programming interface (API) being accessed by an application. Examples of object-oriented languages employable for producing the API and the tracing mechanism include ABAP® (Advanced Business Application Programming) by SAP AG, Java® by Sun Microsystems, Inc., and others. In general, the tracing is facilitated by the creation and use of one or more proxy objects that encapsulate or otherwise hide one or more objects of the API. The proxy objects facilitate tracing by, for example, recording method calls for later analysis and testing of the API and/or application. Described below are two different techniques for generating the proxy objects, named temporary encapsulation and permanent encapsulation. Any particular tracing mechanism according to the embodiments discussed herein may employ temporary encapsulation, permanent encapsulation, or some combination thereof, depending on the structure of the API, the needs of the software developers of the API or application, and other factors. Other aspects of the embodiments discussed herein may be ascertained from the following detailed description.

Figure 1:
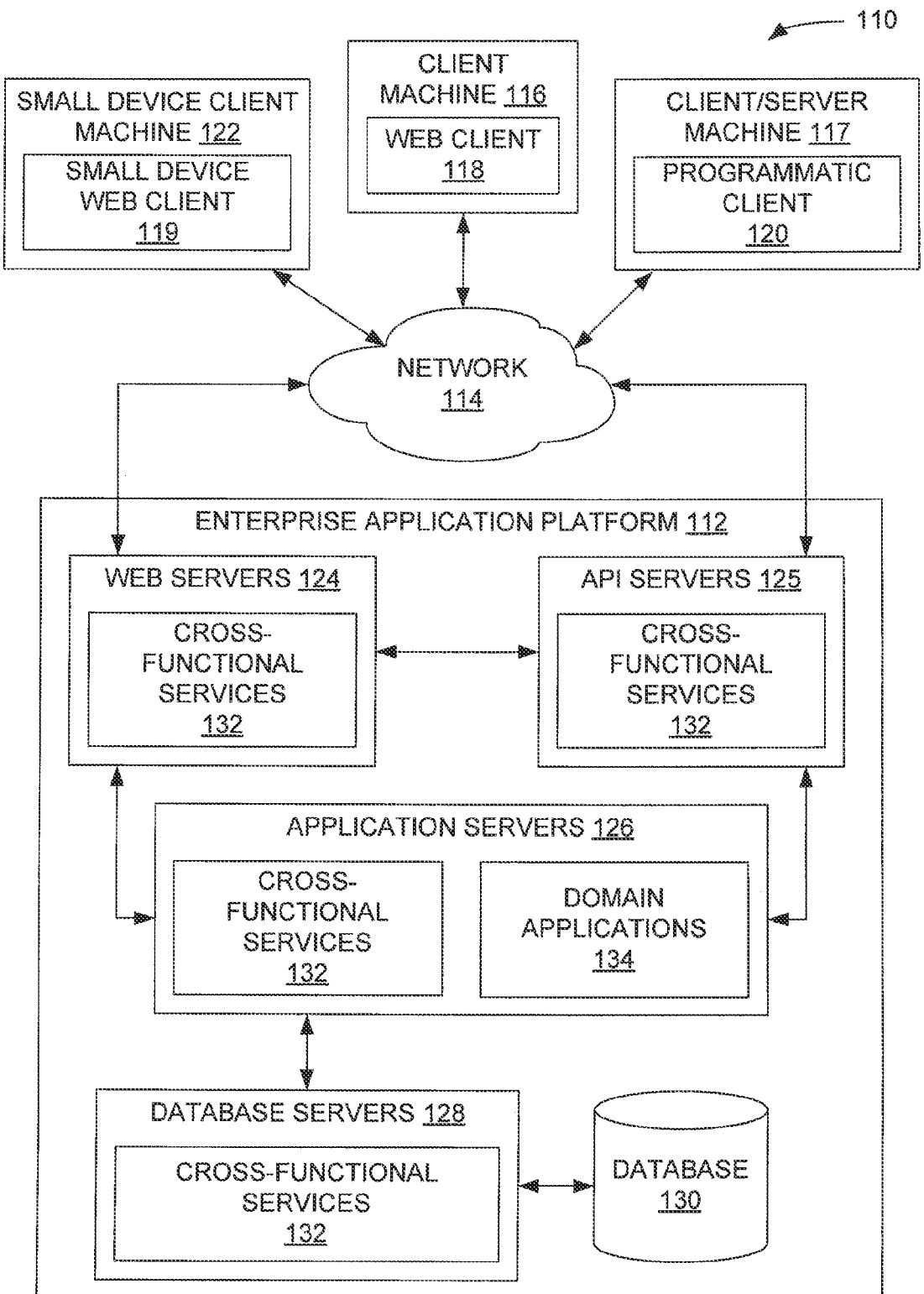
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft Corporation), a small device client machine 322 with a small device web client 119 (e.g., a browser without a script engine), and a client/server machine 117 with a programmatic client 120.

Turning specifically to the enterprise application platform 112, web servers 124 and application program interface servers 125 are coupled to, and provide web and programmatic interfaces to, application servers 126. The application servers 126 are, in turn, shown to be coupled to one or more database servers 128 that may facilitate access to one or more databases 330. The web servers 124, application program interface servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 322. In addition, the cross-functional services 132 may provide an environment for delivering enhancements to existing applications and for integrating third party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
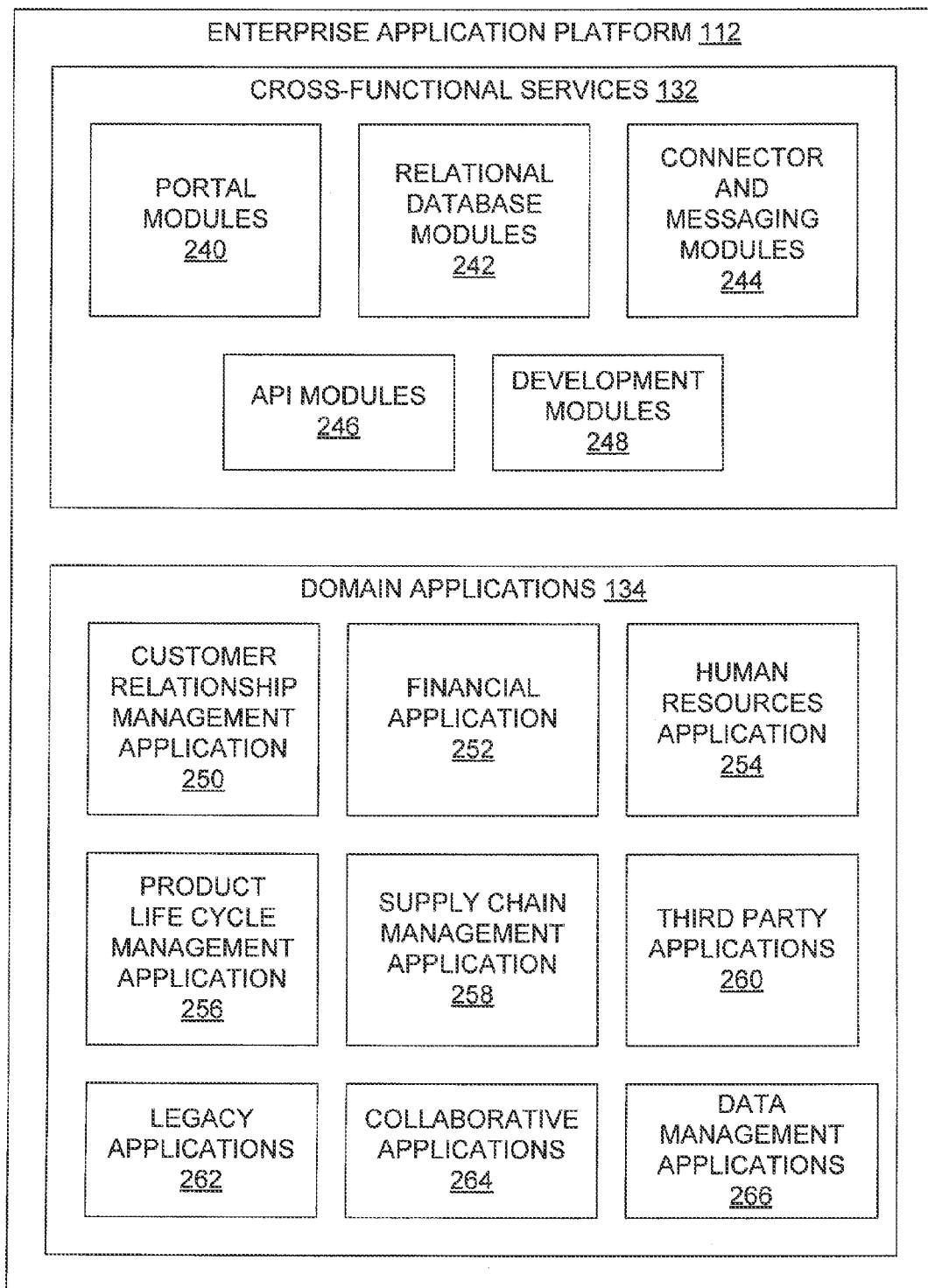
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, application program interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java, J2EE, SAP's Advanced Business Application Programming (ABAP®) Language and Web Dynpro, XML, JCA, JAAS, X.509, LDAP, WSDL, WSRR, SOAP, UDDI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The application program interface (API) modules 246 may enable the development of service-based applications by exposing an interface to existing and new applications as services. Repositories may be included in the platform 112 as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the life cycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 334 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
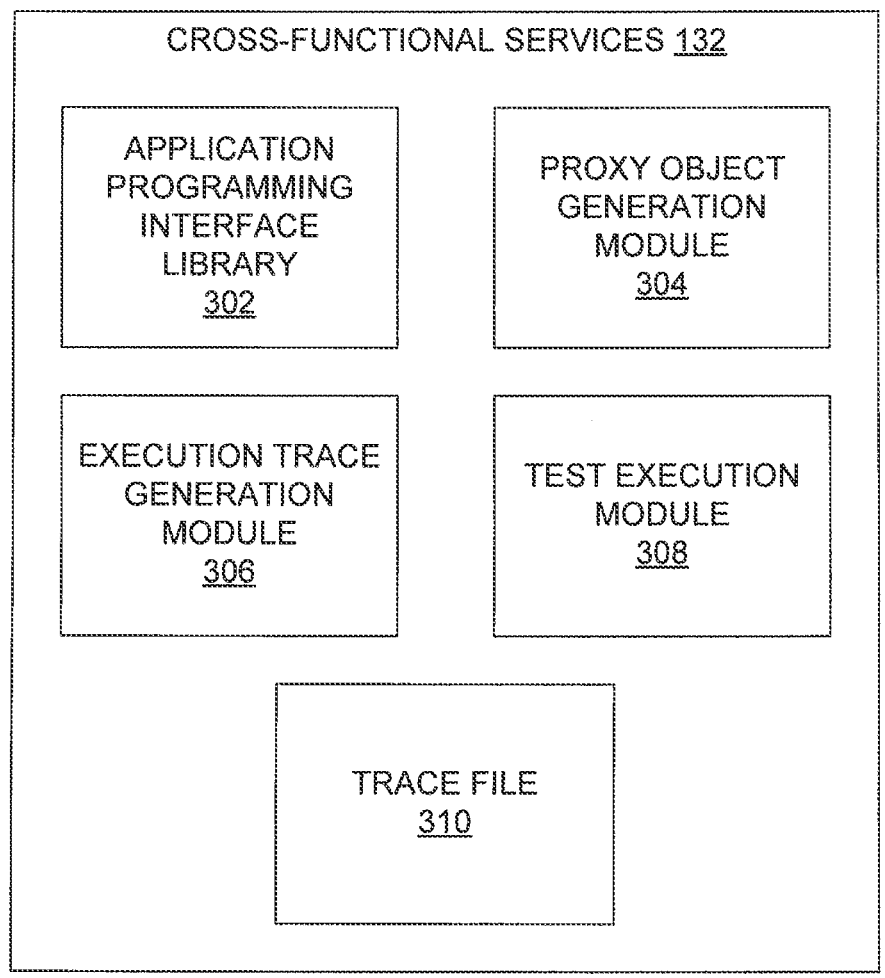
FIG. 3 is a block diagram of example modules utilized in the cross-functional services of FIG. 1 for systems and methods of tracing an application programming interface.

FIG. 3 is a block diagram of example modules employable in the cross-functional services 132 of FIG. 3 for systems and methods of tracing an API. In the example of FIG. 3, the cross-functional services 132 include an application programming interface library 302, a proxy object generation module 304, an execution trace generation module 306, a test execution module 308, and a trace file 310 or similar data structure. In some implementations, one or more of these modules may be incorporated in other modules of the cross-functional services 132. For example, the API library 302 may exist as one or more of the API modules 246 (FIG. 2), which may expose interfaces of one or more of the domain applications 334 (FIG. 2) for use by one or more client machines 116, 117, and 122 (FIG. 1). In another implementation, one or more of the modules 302 through 310 may exist as one or more of the development modules 248 (also FIG. 2). Further, any of the modules 302 through 310 may be combined into fewer modules, or may be partitioned into a greater number of modules. In addition, while the embodiments discussed herein presume the use of the client-server architecture of the system 110 of FIG. 1, the modules 302 through 310 may be employed in a peer-to-peer arrangement, or even within a single computing system hosting both the API and the application accessing the API.

The API library 302 may define one or more object-oriented classes by which objects of the API may be created. The created API objects may include methods available for use by an external application to access the various domain applications 134 provided in the enterprise application platform 112 (FIG. 1). As described more fully below, the use of the API objects by the external application may be traced to allow analysis of the functioning of the API and the use of the API by the external application. The API objects may be structured such that the external application need only access one or a few "root" API objects directly to perform its desired functions. In this example, the external application may access other API objects via the root API objects. In other cases, a significant number of API objects may be accessible to the application directly. Also, some API libraries may be designed to allow only one-way calls of API methods from the external application, while other API libraries may include objects that call methods of the external application, thus facilitating a two-way calling environment. Such an environment facilitates "eventing," in which the API may asynchronously alert the external application to an event detected by the API. In some implementations, the design or structure of the API may be considered in determining how the tracing of the API is best implemented.

The proxy object generation module 304 may generate or create the one or more proxy objects responsible for recording method calls and other information involving the use of the API. In one example, the API library 302 may include or make reference to the proxy object generation module 304 to facilitate the creation of the proxy objects in response to the creation of one or more of the API objects. In another example, the functionality of the proxy object generation module 304 may be incorporated into one or more of the API classes such that a call to a constructor method for an API object may result in the creation of the both the intended API object and its corresponding proxy object. Other implementations of the proxy object generation module 304 are also possible.

The execution trace generation module 306 may receive the recorded method calls and other related information from the one or more proxy objects created via the proxy object generation module 304 and generate a trace data structure, such as the trace file 330. In one example, the trace file 310 may be a human-readable (e.g., textual) sequential listing of the various method calls made to the API, possibly along with parameters and return values associated with those calls. Other information that may be recorded by the proxy objects may also be included. In another example, the execution trace generation module 306 may generate a trace file 310 that includes machine-executable or machine-interpretable information, such as a sequence of method calls and associated data that may be executed by the test execution module 308 to recreate the recorded execution of the API.

Figure 4:
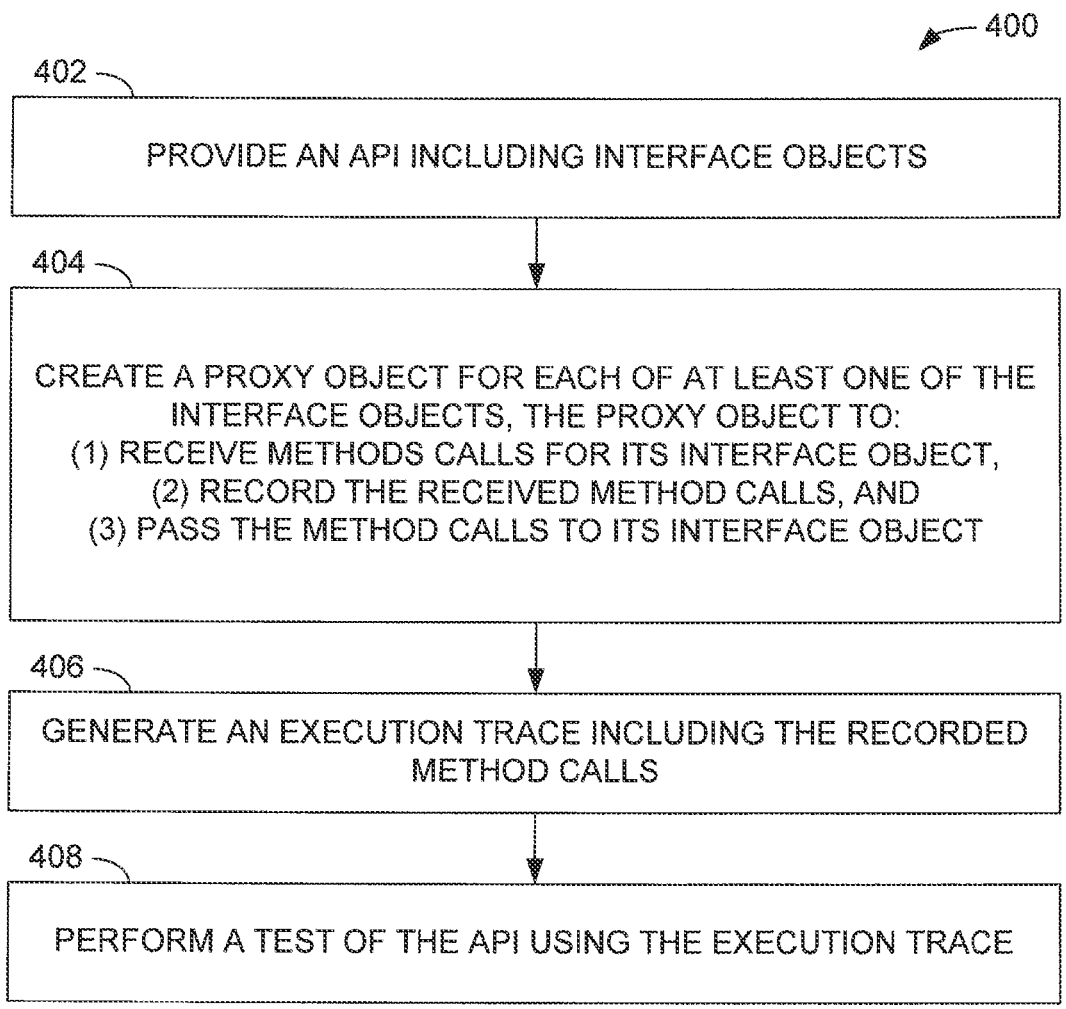
FIG. 4 is a flow diagram of an example method of tracing an application programming interface.

FIG. 4 is a flow diagram illustrating an example method 400 of tracing an application programming interface. In the method 400, an API including one or more interface objects is provided (operation 402), such as via the API library 302 (FIG. 3). For example, an external application may call one or more methods of an API class to create the one or more interface objects, which the external application may then initialize and use as desired to utilize the functions provided by the API.

For each of the at least one of the interface objects provided, a proxy object is created (operation 404), such as via the proxy object generation module 304 (FIG. 3). Each of the proxy objects is configured to receive one or more method calls for the interface object corresponding to the proxy object, record the received method calls, and pass the received method calls to the corresponding interface object. As is described in greater detail below, the generation of the proxy objects, as well as how the proxy objects are employed, may depend on the nature of the API library 302, the preferences of the software developer, and other factors.

Continuing with the method 400, the execution trace generation module 306 (FIG. 3) may generate an execution trace (operation 406), such as the trace file 310 (also FIG. 3). The text execution module 308 (FIG. 3) may then perform a test of the API using the execution trace (operation 408).

While the operations 402 through 408 of the method 400 of FIG. 4 are shown in a specific order, other orders of operation, including possibly concurrent execution of at least portions of one or more operations, may be possible in some implementations. For example, the interface objects and their associated proxy objects may be created concurrently in some implementations. Further, the generation of the execution trace may occur concurrently with the recording of the method calls performed by the proxy objects.

Figure 5:
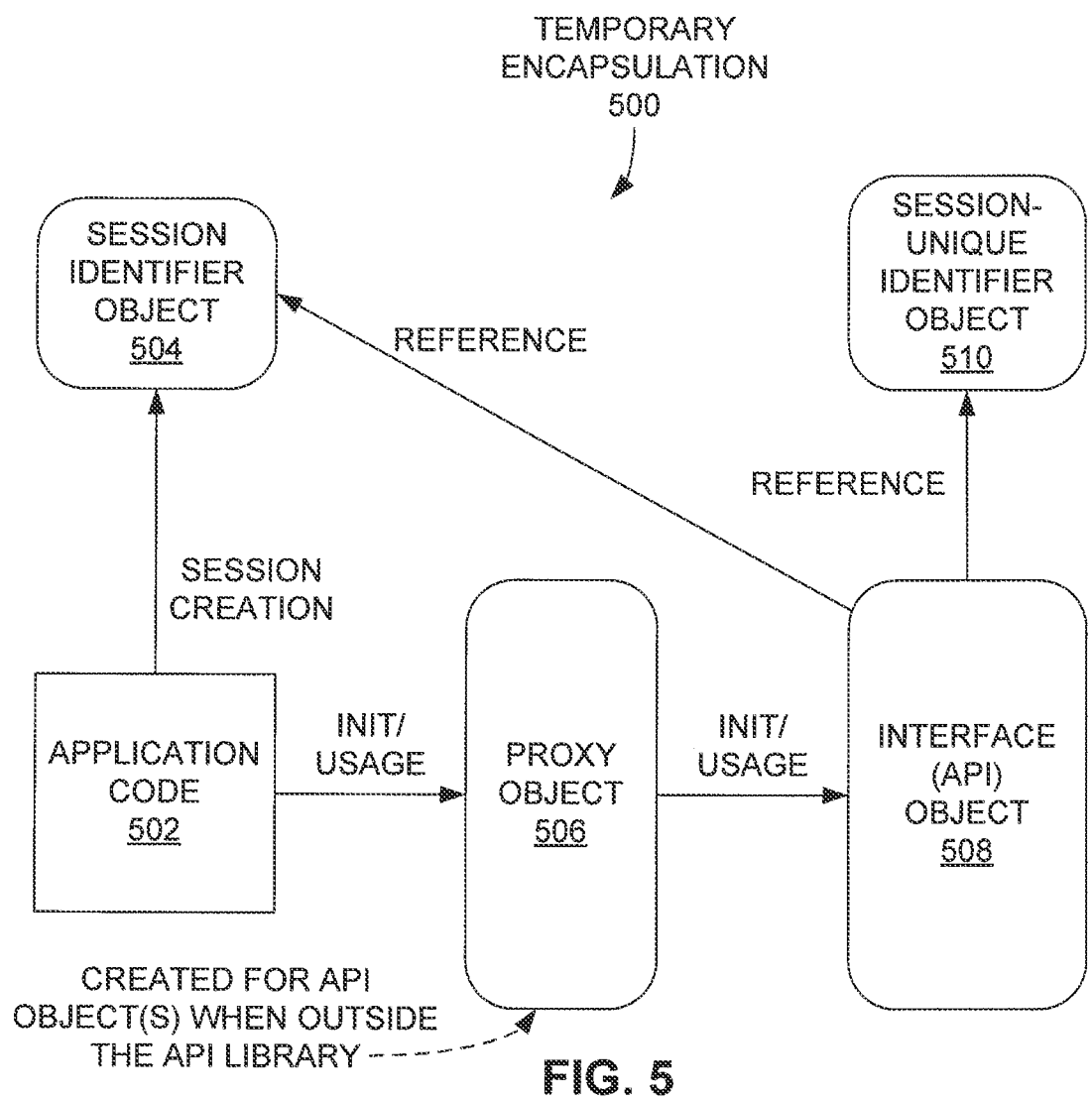
FIG. 5 is a block diagram illustrating an example of temporary encapsulation for tracing of an application programming interface.
Figure 6:
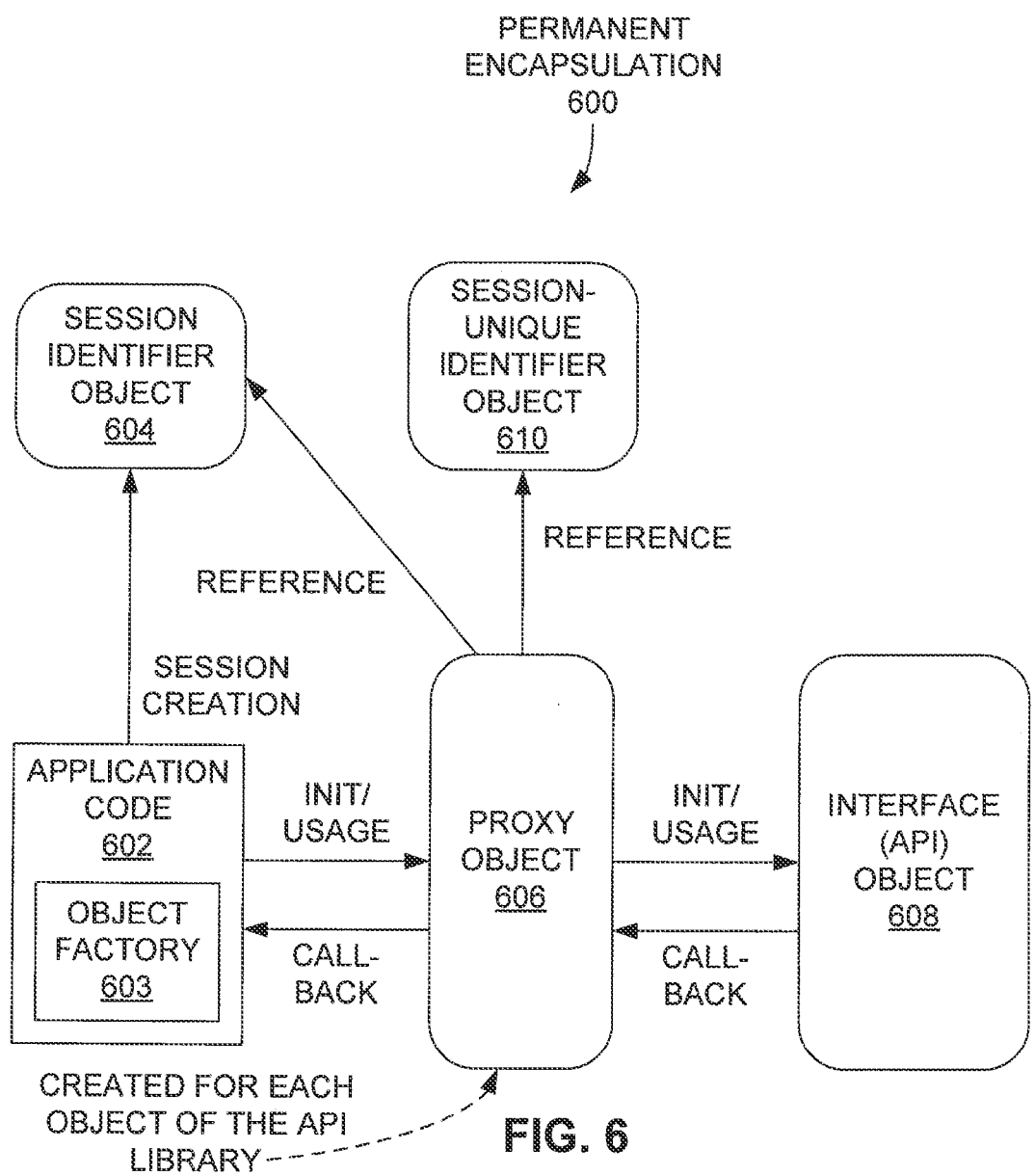
FIG. 6 is a block diagram illustrating an example of permanent encapsulation for tracing of an application programming interface.

FIGS. 5 and 6 describe different mechanisms for generating and using the proxy objects described above for purposes of tracing the API. More specifically, FIG. 5 describes temporary encapsulation 500 of interface objects by proxy objects, while FIG. 6 depicts permanent encapsulation 600 of interface objects by proxy objects. Generally, encapsulation is the logical hiding or surrounding of the interface object from application code by the proxy object to facilitate recording of method calls to the interface object by the proxy. As a result, from the standpoint of the application code, the proxy object is serving as a proxy for the interface object being accessed by the application code. In either implementation, the proxy objects may be dynamically-created library-side code. The ability to generate this proxy code at runtime may be provided at least in part by the use of virtual machines for execution of object-oriented programs, which allows dynamic class loading at runtime. One example of such a machine is the Java Virtual Machine (JVM) typically employed to execute Java® programs. In examples in which a virtual machine is not employed, the proxy objects may be generated at compile time. As a result, both temporary encapsulation 500 and permanent encapsulation 600 may be employed in both virtual machine and non-virtual machine environments.

FIG. 5 provides a block diagram illustrating an example of temporary encapsulation 500. Application code 502, in response to being employed by a user to access another application via the API, such as one or more domain applications 134 (FIG. 1), may create and initialize a session identifier object 504. The session identifier object 504 maintains a session identifier that identifies the current user session by way of a numeric value, an alphanumeric value, a character string, or other means. The session identifier may thus aid in distinguishing objects and associated method calls between different user sessions that may be executing in the system 310 (FIG. 1) simultaneously.

Also, application code 502, in using the API library 302 (FIG. 3), may also create one or more interface (API) objects 508, such as by way of a call to a constructor method associated with the interface object 508. Such an API object 508 that is directly accessed by the application code 502 may be considered an API "root" object 508. In response to the API root object 508 being accessed in the application code 502, such as by being provided as a return object to the application code 502, a proxy object 506 is created to encapsulate and reference the root API object 508. In addition, other API objects 508 that leave the API library 302, such as by being a return value to the application code 502, may each have a proxy object 506 created for that API object 508. In one example, these other API objects 508 are accessed via a root API object 508, in which case the proxy object 506 for the root API object 508 may be responsible for causing the creation of the proxy object 506 for the other API objects 508 leaving the API library 302 via the root API object 508. Accordingly, other API objects 508 not accessed by or passed to the application code 502 may not cause another proxy object 506 to be created. As a result, only root API objects 508 and other API objects 508 that are passed to the application code 502 may be encapsulated by proxy objects 506. Any initialization and subsequent usage of the root API objects 508 by the application code 502 is then carried out through the proxy object 506.

After its creation, each root API object 508 and other API objects 508 that may be passed to the application code 502 may cause the generation of a corresponding session-unique identifier object 510 that identifies the API object 508. Further, these API objects 508 may be configured to reference both the session identifier object 504 and its session-unique identifier object 510. These two identifier objects 504 and 510 allow the API object 508, as well as parameters provided to the API object 508, to be identified for trace generation. The API object 508 is chosen to reference the identifier objects 504 and 530 since the encapsulation of the API object 508 by its proxy object 506 is temporary in nature.

While the API object 508 is being accessed in the application code 502, all method calls, including the provision of parameters to the API object 508 and the receiving of a result from the API object 508, are carried out through the proxy object 506. When the API object 508 leaves the application code 502, the proxy object 506 may be removed and placed in a separate proxy object storage area, such as a memory cache, in case the proxy object 506 for the API object 508 is needed at a later time, such as when the API object 508 is again returned to the application code 502. In one example, a cached proxy object 506 may be retrieved using the session-unique identifier for the associated API object 508. In some implementations, the storage and retrieval of previously created proxy objects 506 may be performed by a central cache manager. In one example, the central cache manager functionality may be incorporated into the proxy object generation module 304 (FIG. 3). The use of a proxy object cache may facilitate faster processing of the proxy objects 506 and reduced memory fragmentation due to the reduced amount of allocating and freeing of storage for the proxy objects 506.

In one implementation, when the application code 502 makes a method call through a proxy object 506, when the proxy object 506 is used as a parameter in a method call to a root API object 508, or when the proxy object 506 is otherwise being returned to the API library 302, the corresponding API object 508 replaces its proxy object 506. When the API object 508 is then to be returned to the application code 502, the session-unique identifier object 510 may be checked to determine if the session-unique identifier object 510 is registered as a proxy. If so, the API object 508 is replaced with its corresponding proxy object 506 from the cache so that the proxy object 506 is returned to the application code instead of the API object 508. If, instead, the session-unique identifier object 510 is not registered as a proxy, a new proxy object 506 is created for the API object 508, and the new proxy object 506 is returned to the application code 502.

FIG. 6 provides a block diagram illustrating an example of permanent encapsulation 600. Generally, unlike temporary encapsulation 500, each interface (API) object 608 is encapsulated with, and referenced by, a corresponding proxy object 606, regardless of whether the API object 608 may be considered a root API object 608 or may be provided to application code 602. More specifically, for each API object 608 created, either by way of the application code 602 or another API object 608, a corresponding proxy object 606 is created. Also unlike in temporary encapsulation 500, each of the proxy objects 606 created may remain in existence during the entire lifetime and usage space of their corresponding API objects 608 in the permanent encapsulation 600 model. To facilitate the creation of the API objects 608 and their corresponding proxy objects 606, the application code 602 may incorporate an object factory 603 to provide a method for creating both the API objects 608 and their proxy object 606 counterparts.

As with the application code 502 associated with the temporary encapsulation 500 model, the application code 602 of the permanent encapsulation 600 model generates a session identifier object 604. However, in contrast to the temporary encapsulation 500 mechanism of FIG. 5, in which each root API object 508 creates its own session-unique identifier object 530, each proxy object 606 of the permanent encapsulation 600 environment creates and references a session-unique identifier object 610 for its corresponding interface object 608. Each proxy object 606 may then reference the session identifier object 604 and its session-unique identifier object 610 directly since the proxy object 606 remains throughout the existence of its corresponding interface object 608.

In both temporary encapsulation 500 and permanent encapsulation 600, each of the proxy objects 506 and 606 is created to record method calls from the application code 502 and 602 to the API object 508 and 608 corresponding to the proxy object 506 and 606 to generate an execution trace of the API. However, given their basic differences, temporary encapsulation 500 and permanent encapsulation 600 each exhibits its own strengths and weaknesses in terms of applicability and ease of use with respect to the structure of the API library 302 (FIG. 3) being utilized. For example, the use of temporary encapsulation 500 may facilitate the generation of a relatively few proxy objects 506, as only those API objects 508 that are passed or returned to the application code 502 are associated with proxy objects 506, thus restricting the impact of tracing on the code development of the API library 302 to those classes associated with API objects 508 that may be accessed in the application code 502. Accordingly, the proxy objects 506 are not employed within the API library 302, but only within the application code 502, thus reducing the impact on performance while in tracing mode.

These positive aspects of temporary encapsulation 500 may compare favorably to permanent encapsulation 600, in which each created API object 608 is encapsulated within its own proxy object 606, with each proxy object 606 being used throughout the lifetime of its corresponding API object 608. Thus, permanent encapsulation 600 may generally require more development time and impact performance more significantly than temporary encapsulation 500.

However, permanent encapsulation 600 is generally more robust than temporary encapsulation 500 by providing greater protection against tracing fragmentation and program errors. As is described more completely below, temporary encapsulation 500 captures all method calls for an API with a clear internal/external boundary with one or only a few gateways (e.g., root API objects 508), and in which method calls are only made from the application code 502 to the root API objects 508. For example, if the API library 302 is configured to allow for callbacks from one or more of the API objects 508 to the application code 502 in addition to the calls from the application code 502 to the API objects 508, such calls may not pass through a proxy object 506 and thus may not be recorded for tracing purposes. Permanent encapsulation 600 helps protect against such problems by employing a proxy object 606 for each API object 608, thus reducing the possibility of an untraced callback from an API object 608 to the application code 602.

Overall, the choice between temporary encapsulation 500 and permanent encapsulation 600 affects several different aspects of program operation. One such aspect is object creation, as mentioned above. In permanent encapsulation 600, a proxy object 606 is created in order to encapsulate each created API object 608 and maintained throughout the lifetime of that object. In temporary encapsulation 500, proxy objects 506 are created only to encapsulate one or more root API objects 508 directly accessible by the application code 502, as well as other API objects 508 passed to the application code 502 via the root API objects 508, thus reducing the number of proxy objects 506 that are to be created. As a result, such encapsulation automatically encapsulates all child API objects 508 accessed via the one or more root API objects 508.

Another area impacted by the decision of temporary encapsulation 500 or permanent encapsulation 600 is the casting of objects, by which a receiver of an object may cast the object to a different or more specific object type than that indicated by the object class. In permanent encapsulation 600, all casts to more specific implementations between API objects 608 are replaced with internal interfaces due to the presence of the proxy objects 606 for every API object 608. Oppositely, due to the lack of proxy objects 506 between API objects 508 in temporary encapsulation 500, object casting does not cause significant problems.

Object comparison is another area which may be affected by the choice of encapsulation. In some examples, object comparison, in which one object may be compared to another for equality, may be performed by way of pointers to the objects being compared, or by way of a semantic "equals" comparison of the objects via their constituent members. In a one-way API call environment, in which the application code 502 makes method calls into the API, but the API is not making callbacks into the application code 502, temporary encapsulation 500 does not cause significant problems, as every parameter object is replaced with its original API object 508, as opposed to the proxy object 506 associated with the API object 508. As a result, the results of object comparison in the one-way call environment are as expected when temporary encapsulation 500 is employed.

Using permanent encapsulation 600, however, the use of a proxy object 606 for each API object 608 causes problems with pointer-based object comparisons since the pointer to the proxy object 606 does not equal the pointer to its corresponding API object 608. One way to address this potential problem is to replace direct pointer comparisons in the API objects 608 with the "equals" comparison method in the associated class and by replacing the parameters of the proxy object 606 with its corresponding API object 608 in the code implementing the "equals" comparison method.

A two-way API call environment in which the API objects 508 and 608 may generate callbacks into the application code 502 and 602, such as for event propagation, complicates the issue of "equals" comparisons. In permanent encapsulation 600, each class of the API library 302 capable of performing a callback to a method outside the API library 302 may provide a method in which the corresponding proxy object 602 can be set instead of using a pointer, such as the "this" pointer of Java®. In this example, the proxy object 606 may be set to its corresponding API object 608 immediately after creation of the proxy object 606. As a result, the API object 608 is then using either the pointer during normal, non-tracing execution mode or its proxy object 606 in tracing mode. For temporary encapsulation 500, the application code 502 may be rewritten to use the "equals" comparison method instead of the direct object pointer comparison method. Also, the API library 302 (FIG. 3) classes may be written to use overloaded comparison and hash methods (used in classes to implement the "equals" comparison method) using the object identifiers.

Regarding the object identifiers to be recorded for tracing purposes, in permanent encapsulation 600, the session-unique identifier object 610 and the session identifier object 604 are referenced by the proxy object 606 for its corresponding API object 608. As a result no additional information is needed for the proxy object 606, as the proxy object 606 is available throughout the lifetime of its API object 608. Accordingly, the proxy object 606 may also be employed to trace API objects 608 from classes residing external to the API library 302 (FIG. 3). For temporary encapsulation 500, the API object 508 may directly provide its session-unique identifier object 510 and the session identifier object 504 for tracing purposes since the API object 508 is configured to reference those objects 504 and 510 due to the temporary nature of its associated proxy object 506. However, facilitating this functionality may be costly to add at design-time, as well as memory-intensive at runtime. In an alternative, a mapping that maps string-like identifiers to session-unique identifier objects 510 may reduce the amount of storage used to write, read and maintain the session-unique identifier objects 510. In one example, the mapping may be performed by way of a fingerprint algorithm, such as MD5 (Message-Digest Algorithm 5) or SHA-1 (Secure Hash Algorithm 1), as a hash to generate the string-like identifiers, albeit with some possible performance penalty.

With respect to method invocation of the API object 508 and 608, the corresponding proxy object 506 and 606 may record the session-unique identifier object 510 and 610 of the API object 508 and 608, the identity of the method being invoked (possibly including a canonical name of the method in addition to the interface and associated signature), and the parameter and return value involved (either as atomic values or as references to other objects). For permanent encapsulation 600, the proxy object 606 routes the parameters and return value between the object invoking the method and the object executing the method. One possible exception to this rule is the "equals" comparison method, in which the proxy object 606 is replaced with its corresponding API object 608 prior to the comparison being executed. For temporary encapsulation 500, the return value from an API object 508 is assigned a proxy object 506 before being returned to the application code 502. Such a proxy object 506 may either be newly created if the API object 508 has not been previously assigned, or be assigned the same proxy object 506 to which it was previously assigned. In one example, the previously-assigned proxy object 506 may be identified by the identifier of the API object 508 and retrieved from a proxy object storage area of memory, such as a cache. If the API object 508 cannot be determined, the tracing information associated with the method call may be marked as unresolved.

Given the various benefits and challenges associated with temporary encapsulation 500 and permanent encapsulation 600, and that these positive and negative aspects are dependent at least in part on the structure of the API library 302 (FIG. 3), some implementations may employ a hybrid approach combining both temporary encapsulation 500 and permanent encapsulation 600. For example, most API objects 506 and 606 of the API library 302 may be sufficiently traced by use of temporary encapsulation 500. However, for those API objects 506 and 606 which are more important, or that may provide a callback path to the application code 502 and 602, permanent encapsulation 600 may be employed specifically for those API objects 506 and 606. Other factors, such as the amount of development time to be expended and the robustness of the tracing scheme desired, may also be considered when determining whether to implement temporary encapsulation 500, permanent encapsulation 600, or some combination thereof.

As a result of the recording of the API method calls and associated data by the proxy elements 506 and 606, the execution trace generation module 306 (FIG. 3) may use the recorded information to generate the trace file 310 (also FIG. 3). The trace file 310 represents a reconstruction of the program flow associated with the application code 502 and 602. Such a reconstruction may aid a developer in detecting and correcting problems with the software. In one example, the trace file 310 includes a standalone class having a method that defines the complete API calling sequence based on the recorded method call information. In this implementation, the test execution module 308 (also FIG. 3) may call the standalone method representing the trace to recreate the original program execution, thus providing the developer with a way to recreate any problems that may have occurred during the original execution.

In many examples, the recorded trace is extremely long and may include one or more gaps in the execution stream. In some cases, one or more objects may not be trace-enabled due to an error in the software. For example, a parameter input for a called method may be missing or invalid, causing the return value for that method to also be invalid, thereby causing methods that use the invalid return value as a parameter to also be invalid, all of which may complicate the ability to trace the execution flow correctly. In other instances, optimization of code, such as the removal of getter and similar methods providing return values that are ultimately not used, may also cause problems in trace recording. In yet other cases, parameters for some methods may be hidden in set or list containers, which may also be copied in other containers, and so on, making object reconstruction for a trace difficult.

To address potential gaps in a trace, a rescue point for each of one or more API objects 508 and 608 may be recorded when the API object 508 and 608 is created in one embodiment. In one example, the rescue point may be a traced description of how the object of interest is to be reconstructed when a parent object of the object of interest is available. In one embodiment, the reconstruction may be performed by calling a getter method provided by the parent object, possibly using some constant parameter value to reconstruct the object of interest. By placing such a rescue point in the trace file 310 for each object, the execution trace generation module 306 (FIG. 3) may use the rescue points to reduce or eliminate missing, incomplete, or unknown parameter objects that would otherwise cause gaps in the execution trace file 310.

In at least some embodiments discussed herein, an API tracing mechanism that employs proxy objects for the recording of method calls and associated information is supported. One of two different techniques, or some combination thereof, of implementing the proxy objects may be employed to provide the most cost-effective tracing capability for the particular API library structure involved. The addition of rescue points in the recorded information may also help prevent gaps that often occur in tracing information. Overall, these techniques support multiple-session environments and facilitate customer-enabled tracing in a virtual machine executing on a production platform.

While the above discussion focuses on enterprise applications and platforms and their associated client systems, any device executing software or firmware may benefit from application of the various principles described herein. For example, the tracing techniques discussed above may be implemented in general-purpose computing systems, as well as in special-purpose embedded systems, such as cellular phones, personal digital assistants (PDAs), computer tablets, entertainment system components, "smart" appliances, gaming systems, and so on.

Figure 7:
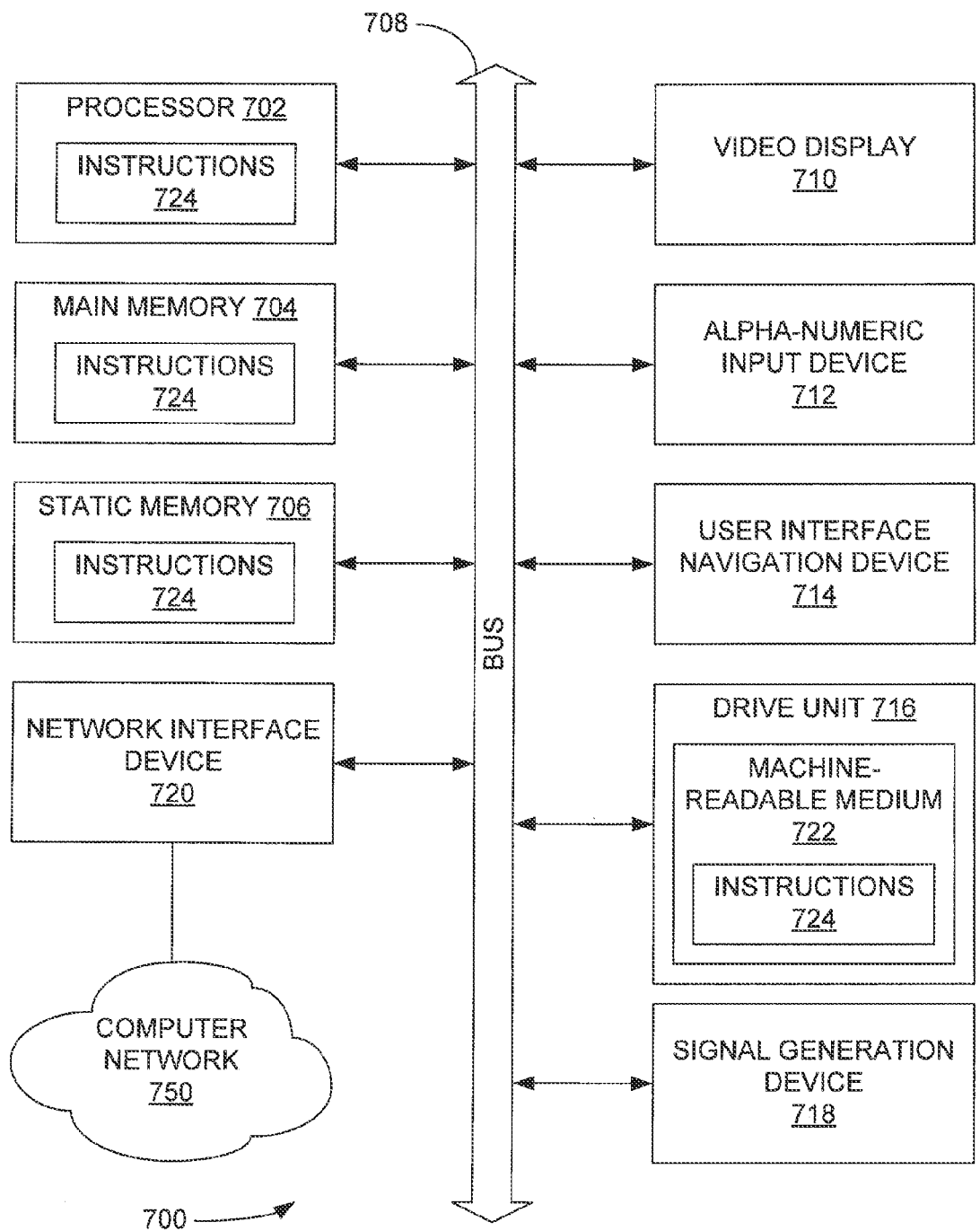
FIG. 7 depicts a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU), or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD), or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (e.g., within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising:
  providing an application programming interface for an application, the application programming interface comprising a plurality of interface objects;
  creating a distinct proxy object for each of the plurality of interface objects, each of the proxy objects encapsulating the interface object corresponding to the proxy object;

receiving, at each of the proxy objects, method calls from the application for the interface object corresponding to the proxy object;
recording, at each of the proxy objects, using at least one processor of a machine, the received method calls;
passing, at each of the proxy objects, the received method calls to the interface object corresponding to the proxy object;
creating, for at least one of the interface objects, a rescue point, wherein a rescue point is a traced description of how the associated interface object is to be reconstructed, and
generating an execution trace comprising the recorded method calls, wherein generating an execution trace includes using one or more rescue points to reduce or eliminate gaps.

2. The method of claim 1, the creating of the proxy object for each of the at least one of the plurality of interface objects being performed via an object factory in response to creation of the interface object corresponding to the proxy object.

3. The method of claim 1, the creating of the proxy object occurring in response to the interface object corresponding to the proxy object being returned to the application.

4. The method of claim 3, further comprising:
removing the proxy object to a proxy object storage area in response to the proxy object being returned from the application.

5. The method of claim 1, further comprising:
generating an identifier for a session in which the application is executed; and
for each proxy object, generating a session-unique identifier for the interface object corresponding to the proxy object, the identifier for the session and the session-unique identifier for the interface object corresponding to the proxy object being accessible via the interface object corresponding to the proxy object.

6. The method of claim 1, further comprising:
generating an identifier for a session in which the application is executed; and
for each of the proxy objects, generating a session-unique identifier for the interface object corresponding to the proxy object, the identifier for the session and the session-unique identifier for the interface object corresponding to the proxy object being accessible via the proxy object.

7. The method of claim 1, the recording, at each of the proxy objects, of the received method calls comprising recording an identifier of the corresponding interface object, parameters of the corresponding interface object, and a return value of the corresponding interface object.

8. The method of claim 1, further comprising:
generating, in response to the creating of the proxy object, construction information for constructing the interface object corresponding to the proxy object based on a parent object of the interface object, the execution trace comprising the construction information.

9. The method of claim 8, the construction information comprising a call to a getter method provided by the parent object.

10. The method of claim 1, further comprising:
performing a test of the application using the execution trace, the execution trace comprising a generated method including a sequence of the recorded method calls.

11. A non-transitory computer-readable storage medium comprising instructions that, when executed by at least one processor of a machine, cause the machine to perform operations comprising:
providing an application programming interface for an application, the application programming interface comprising a plurality of interface objects;
creating a distinct proxy object for each of the plurality of interface objects, each of the proxy objects encapsulating the interface object corresponding to the proxy object;
receiving, at each of the proxy objects, method calls from the application for the interface object corresponding to the proxy object;
recording, at each of the proxy objects, the received method calls;
passing, at each of the proxy objects, the received method calls to the interface object corresponding to the proxy object;
creating, for at least one of the interface objects, a rescue point, wherein a rescue point is a traced description of how the associated interface object is to be reconstructed, and
generating an execution trace comprising the recorded method calls, wherein generating an execution trace includes using one or more rescue points to reduce or eliminate gaps.

12. The non-transitory computer-readable storage medium of claim 11, the operations further comprising:
receiving a user command to generate the execution trace, the creating of the proxy object for the interface object being based at least in part on the receiving of the user command.

13. A system comprising:
at least one processor; and
modules comprising instructions that are executable by the at least one processor, the modules comprising:
an application programming interface library for an application, the application programming interface library comprising a plurality of interface objects;
a proxy object generation module to create a distinct proxy object for each of the plurality of interface objects, each of the proxy objects encapsulating the interface object corresponding to the proxy object, the proxy object to:
receive method calls made by the application for the interface object corresponding to the proxy object;
record the received method calls; and
pass the received method calls to the interface object corresponding to the proxy object; and
an execution trace generation module to:
create, for at least one of the interface objects, a rescue point, wherein a rescue point is a traced description of how the associated interface object is to be reconstructed, and
generate an execution trace comprising the recorded method calls, wherein generating an execution trace includes using one or more rescue points to reduce or eliminate gaps.

14. The system of claim 13, the proxy object generation module comprising an object factory to create the proxy object for each of the at least one of the plurality of interface objects in response to creation of the interface object corresponding to the proxy object.

15. The system of claim 13, the proxy object generation module to create the proxy object in response to the interface object corresponding to the proxy object being returned to the application.

16. The system of claim 13, the proxy object to generate, in response to the creating of the proxy object, construction information for constructing the interface object corresponding to the proxy object based on a parent object of the interface object, the execution trace generation module to generate the execution trace comprising the construction information.

17. The system of claim 16, the construction information comprising a call to a getter method provided by the parent object.

18. The system of claim 13, further comprising:
a test execution module to perform a test of the application using the execution trace, the execution trace comprising a generated method including a sequence of the recorded method calls.

* * * * *